United States Patent
Campbell

(10) Patent No.: US 10,341,541 B2
(45) Date of Patent: Jul. 2, 2019

(54) INTEGRATED SENSOR AND LENS ASSEMBLY WITH POST-TUNING OPTICAL ALIGNMENT

(71) Applicant: GoPro, Inc., San Mateo, CA (US)

(72) Inventor: Scott Patrick Campbell, Belmont, CA (US)

(73) Assignee: GoPro, Inc., San Mateo, CA (US)

(*) Notice: Subject to any disclaimer, the term of this patent is extended or adjusted under 35 U.S.C. 154(b) by 45 days.

(21) Appl. No.: 15/233,936

(22) Filed: Aug. 10, 2016

(65) Prior Publication Data

US 2017/0048432 A1 Feb. 16, 2017

Related U.S. Application Data

(60) Provisional application No. 62/205,602, filed on Aug. 14, 2015.

(51) Int. Cl.
*H04N 5/225* (2006.01)
*G02B 27/00* (2006.01)
*G02B 7/02* (2006.01)

(52) U.S. Cl.
CPC .......... *H04N 5/2254* (2013.01); *G02B 7/021* (2013.01); *G02B 7/022* (2013.01); *G02B 7/023* (2013.01); *G02B 27/0006* (2013.01); *H04N 5/2253* (2013.01)

(58) Field of Classification Search
CPC ............... H04N 5/2254; H04N 5/2253; G02B 27/0006; G02B 7/023; G02B 7/021; G02B 7/022
See application file for complete search history.

(56) References Cited

U.S. PATENT DOCUMENTS

| | | | | |
|---|---|---|---|---|
| 2005/0248684 A1* | 11/2005 | Machida | ................ | G03B 17/00 348/373 |
| 2006/0170817 A1* | 8/2006 | Wu | ................ | H04N 5/2251 348/373 |
| 2007/0196094 A1* | 8/2007 | Chiang | ................ | G02B 7/04 396/144 |
| 2008/0309814 A1* | 12/2008 | Kinoshita | ................ | G02B 13/001 348/340 |
| 2010/0271541 A1* | 10/2010 | Chou | ................ | G02B 7/08 348/374 |
| 2010/0290140 A1* | 11/2010 | Ko | ................ | G02B 7/026 359/827 |
| 2011/0286737 A1* | 11/2011 | Kim | ................ | G03B 17/02 396/533 |

* cited by examiner

*Primary Examiner* — Albert H Cutler
(74) *Attorney, Agent, or Firm* — Young Basile Hanlon & MacFarlane, P.C.

(57) ABSTRACT

An integrated image sensor and lens assembly may include a lens barrel, a collet, and a lens mount. The lens barrel may be coupled to the collet which is coupled to the lens mount. The lens barrel and the collet may each include a fastening structure reciprocal to each other. Alternatively, the collet and the lens mount may each include a fastening structure reciprocal to each other. The optical distance between the set of lenses and the image sensor may be tuned such that the focal plane of the lenses coincides with the image plane. The fastening structures allow the lens barrel to be adjusted relative to the lens mount in order to shift the focal plane in a direction along the optical axis to compensate for focal shifts occurring during assembly/cure and/or temperature cycling.

13 Claims, 5 Drawing Sheets

INTEGRATED SENSOR AND LENS ASSEMBLY WITH POST-TUNING OPTICAL ALIGNMENT

CROSS REFERENCE TO RELATED APPLICATION(S)

This application claims priority under 35 U.S.C. § 119(e) to U.S. Provisional Patent Application Ser. No. 62/205,602, "Integrated Sensor and Lens Assembly with Post-tuning Optical Alignment," filed Aug. 14, 2015. The subject matter of the foregoing is incorporated herein by reference in its entirety.

BACKGROUND

Technical Field

This disclosure relates to a camera, and more specifically, to an integrated sensor and lens assembly of a camera.

Description of the Related Art

Manufacturing of lens assemblies for high-resolution cameras typically require a high degree of precision in positioning components of the lens assembly to ensure that the lens will achieve proper focus. As a result, a challenge exists in achieving a fast, automated, and high-yielding assembly process for high-resolution cameras.

In a conventional manufacturing process, a lens barrel housing the camera lens is placed within a housing assembly affixed to an image sensor. The position of the lens barrel is adjusted relative to the image sensor such that the focal plane of the lens aligns with the image plane of the image sensor. Upon tuning the lens barrel's position and alignment for optical focal length and axial tilt, dimensional shifts of the lens barrel may be introduced such as by post curing and cycling tests. The lens may shift along the optical axis and the optical axis may tilt as a result of the lens barrel shifting, which alters the distance between the lens and the image sensor. This affects focus of the lenses and compromises performance and yield.

BRIEF DESCRIPTION OF THE DRAWINGS

The teachings of the present disclosure can be readily understood by considering the following detailed description in conjunction with the accompanying drawings.

Figure 1:
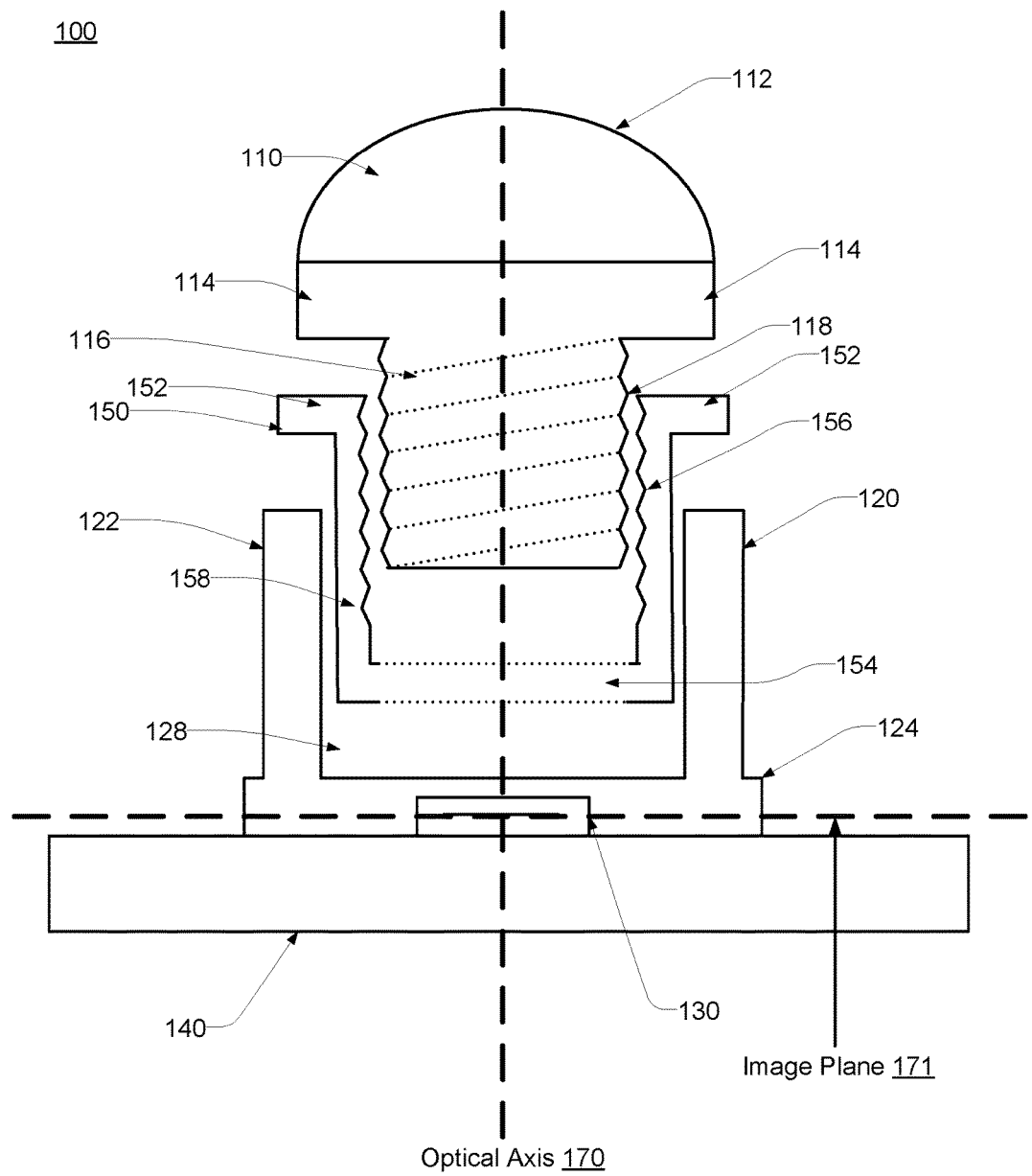
FIG. 1 illustrates a cross-sectional view of a first example integrated image sensor and lens assembly, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

An integrated image sensor and lens assembly may comprise a lens barrel, a collet, and a lens mount. The lens barrel may be coupled to the collet which is coupled to the lens mount. The lens mount may be coupled to an image sensor substrate that has an image sensor lying on an image plane. The lens mount may include a tube portion and a base portion. The tube portion may have a channel and may extend from the base portion in a direction of an optical axis substantially perpendicular to a focal plane. The collet may include a body extending into a channel of a tube portion of the lens mount, and the lens barrel may include a first portion extending into the body of the collet. In some embodiments, the lens barrel and the collet each include a fastening structure reciprocal to each other. The collet may be affixed to the lens mount, for example, via adhesive. In some embodiments, the collet and the lens mount each may include a fastening structure reciprocal to each other. The lens barrel may be affixed to the collet, for example, via adhesive. The optical distance between the set of lenses and the image sensor may be tuned such that the focal plane of the lenses coincides with the image plane. However, posting curing and cycling tests may cause dimensional drifts which cause the focal plane of the set of lenses to shift away from the image plane. The fastening structures allow the lens barrel to be adjusted relative to the lens mount in order to shift the focal plane in a direction along the optical axis to compensate for focal shifts occurring during assembly/cure and/or temperature cycling. As such, the optical distance between the set of lenses and the image sensor can be adjusted post-curing to maintain optimal focus.

FIG. 1 illustrates an exploded cross-sectional view of an embodiment of an integrated image sensor and lens assembly 100 that includes a camera lens barrel 110, a camera lens mount 120, a collet 150, and an image sensor substrate 140. The image sensor substrate 140 has an image sensor assembly 130 (e.g., a high-definition image sensor) for capturing images and/or video. The camera lens mount 120 may be physically affixed to the image sensor substrate 140 and also affixed to the collet 150. The collet 150 may be further coupled to the camera lens barrel 110.

The lens barrel 110 may comprise one or more lenses (e.g., a compound lens) or other optical components to direct light to the image sensor assembly 130. The lens barrel 110 may comprise a lower portion 116, one or more barrel arms 114, and a lens window 112. The lower portion 116 of the lens barrel 110 may be substantially cylindrical and structured to at least partially extend into the body 158 of the collet 150. The barrel arms 114 may extend radially from the body of the lens barrel 110 and may be outside the body 158 of the collet 150 when assembled. The body 158 of the collet 150 may be substantially cylindrical for receiving the lens barrel 110.

The barrel arms 114 may be in contact or in close proximity with the collet arms 152, when assembled. In some embodiments, the lens arms 114 may be used to physically couple the lens barrel 110 to the camera body (not shown). The lens barrel 110 includes a fastening structure such as threads 118 on the outer surface of the lower portion 116 of the lens barrel 110. In FIG. 1, the threads 118 are illustrated with dotted lines to indicate that they are on the outer surface of the lens barrel 110 and not part of the cross-sectional view. The collet 150 may also include a fastening structure, reciprocal to the fastening structure of the lens barrel 110, such as threads 156 on the inner surface of the body 158. The fastening structures of the lens barrel 110 and of the collet 150 may be configured to mate with each other such that the lens barrel 110 may be fastened to the collet 150. The fastening structures of the lens barrel 110 and collet 150 (e.g., threads) may be tunable with respect to each other to enable the vertical position of the lens barrel 110 within the collet 150 to be vertically adjusted. For example, in a threaded assembly, the lens barrel 110 can be rotated in a first direction to lower the lens barrel 110 with respect to the collet 150 and can be rotated in a second direction to raise the lens barrel 110 with respect to the collet 150. The body 158 of the collet 150 may extend away from the lens window 112 when assembled and into the channel of the tube portion 128 of the camera lens mount 120.

The lens window 112 may include optical components to enable external light to enter the lens barrel 110 and be directed to the image sensor assembly 130. In an embodiment, the bottom 154 of the collet 150 has an opening (illustrated with dotted lines) that allows rays of light to pass through to the image sensor assembly 130. For example, the bottom 154 of the collet 150 may be ring shaped. In another embodiment, the bottom 154 of the collet 150 is made of transparent materials to allow rays of light to pass through to the image sensor assembly 130. The arms 152 of the collet 150 may extend radially from the body 158 of the lens barrel 110 and may be outside the channel of the tube portion 128 of the lens mount 120 when assembled. The arms 152 of the collet may be used to physically couple the lens barrel 110 to the camera body (not shown).

The camera lens mount 120 may comprise a base portion 124 and a tube portion 122. The base portion 124 may include a bottom surface in a plane substantially parallel to a surface of the image sensor substrate 140. In one embodiment, the base portion 124 may include a recess (not viewable in FIG. 1) to enable the bottom surface of the base portion 124 to lie flat against the image sensor substrate 140 while partially enclosing the image sensor assembly 130. The tube portion 122 of the lens mount 120 may extend away from the image sensor assembly 130 along the optical axis 170 and may include a substantially cylindrical channel for receiving the collet 150. An adhesive between the collet 150 and the lens mount 120 adheres the outer surface of the body 158 of the collet 150 to the inner surface of the channel 128 of the camera lens mount 120.

The image sensor substrate 140 may comprise a printed circuit board for mounting the image sensor assembly 130 and may furthermore include various electronic components that operate with the image sensor assembly 130 or provide external connections to other components of the camera system. The image sensor assembly 130 may house an image sensor (e.g., a high-definition image sensor) for capturing images and/or video and include structural elements for physically coupling the image sensor assembly 130 to the image sensor substrate 140 and to the camera lens mount 120. The image sensor of the image sensor assembly 130 lies on an image plane 171. The combined focal plane of the lens window 112 and lenses internal to the lens barrel 116 may be maintained to coincide with the image plane 171.

The assembly process for manufacturing the integrated sensor and lens assembly 100 may involve first coupling the lens barrel 110 to the collet 150 via the tunable fastening structures of the lens barrel 110 and of the collet 150. The lens barrel 110 and the collet 150 may be slid into the lens mount 120, and aligned to achieve the best focus while eliminating the tilt of the optical axis 170. The assembled lens barrel 110 and collet 150 may be then affixed to the lens mount 120 by adhering the collet 150 to the lens mount 120 and curing the adhesive. The optical components of the lens barrel 110 may move relative to the image sensor assembly 130 from their aligned positions during the assembly and curing process and/or due to temperature cycling. This causes the optical distance to the image sensor assembly 130 to shift or causes the optical axis 170 to tilt thereby defocusing the assembly 100.

To compensate for focal changes after initial tuning, assembly, and curing, the threaded lens barrel 110 may be rotated within the threaded collet 150 to vertically adjust the position of the lens barrel 110 and to adjust the focal plane thereby to compensate for the focal shifts. This post-tuning operation may be performed, for example, by a tuning machine having a stepper motor that rotates the lens barrel 110 with respect to the collet 150 in a precise manner. In one embodiment, the threads of the lens barrel 110 and the collet 150 are fine pitched such that the focal plane may be adjusted relative to the image plane 171 precisely or substantially precisely in a controlled fashion such that the focal plane is maintained to be aligned with or substantially aligned with the image plane 171. For example, the threads 118 on the surface of the lower portion 116 of the lens barrel 110 and the threads 156 on the inner surface of the body 158 of the collet 150 allow the focal plane to be adjusted by +/−5 um via a minimal angular rotation (e.g., less than 5 degrees). As described herein, substantially aligned refers to the distance between the focal plane and the image plane 171 is within a predefined tolerance that would be acceptable to those skilled in the art. In various embodiments, the predefined tolerance can be, for example, a 1% tolerance, a 2% tolerance, a 5% tolerance, etc.

In some embodiments, after the post-tuning operation adjusts the focal plane to be aligned with or substantially aligned with the image plane 171, the lens barrel 110 may be affixed to the collet 150 which is affixed to the lens mount 120 by adhering the lens barrel 110 to the collet 150 and curing the adhesive. This prevents the lens barrel 110 from moving relative to the collet 150 thereby preventing the optical components of the lens barrel 110 from moving relative to the image sensor assembly 130 from their aligned positions. Accordingly, the focal plane can be maintained in alignment with or substantially in alignment with the image plane 171. The fastening structures can be configured such that the focal plane may be adjusted precisely or substantially precisely relative to the image plane 171 without overburdening any stepper motor quantization of a tuning machine. For example, the lead (i.e., distance along the optical axis that is covered by one complete rotation) or the pitch (i.e., the distance from the crest of one thread to the next) of threads 118 and 156 are within a predetermined range. In addition, the threads are configured to minimize the rotation of the lens barrel 110 relative to the collet 150 thereby to minimize the impact on the position of the optical axis 170.

In various embodiments, as tuning may result in particle generation, a viscous non-curing fluid can be applied to the threads 118 and 156 in order to provide sealing and particle retention. The lower portion 116 of the lens barrel 110 may be tapered and the body 158 of the collet 150 may be configured to include an interior lip (not shown) to retain the fluid and preclude it from being deposited onto an image sensor substrate 140.

Figure 2:
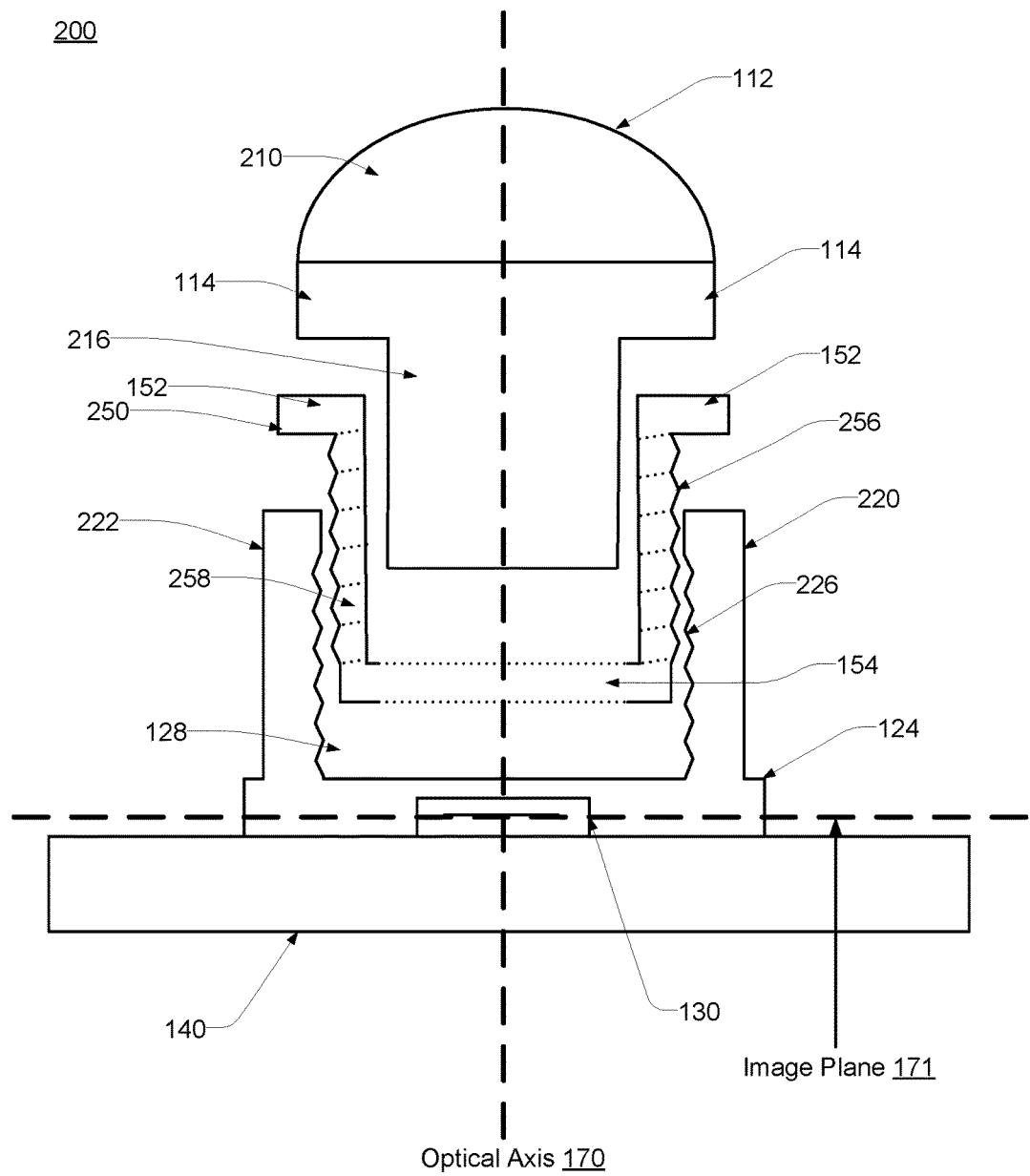
FIG. 2 illustrates a cross-sectional view of a second example integrated image sensor and lens assembly, according to one embodiment.

FIG. 2 illustrates an exploded cross-sectional view of an embodiment of an integrated image sensor and lens assembly 200 that includes a camera lens barrel 210, a camera lens mount 220, a collet 250, and an image sensor substrate 140. The function of the camera lens barrel 210, camera lens mount 220, and collet 250 are the similar to that of the camera lens barrel 110, camera lens mount 120, and collet 150 described above with reference to FIG. 1, respectively. For example, the lens barrel 210 may comprise one or more barrel arms 114, and a lens window 112 described above with reference to FIG. 1 and a lower portion 216. In contrast to the lens barrel 110 described above with reference to FIG. 1, the lens barrel 210 may lack the fastening structure on the outer surface of the lower portion 216 of the lens barrel 210. Furthermore, in contrast to the collet 150 described above with reference to FIG. 1, the collet 250 may lack the fastening structure such as threads on the inner surface of the body 258 and may instead include a fastening structure such as threads 258 on the outer surface of the body 258. The camera lens mount 220 may include a fastening structure such as threads 226 on the surface of the tube portion 222 of the camera lens mount 220.

In contrast to the embodiment illustrated in FIG. 1, the lens barrel 210 may be coupled to the collet 250 by adhering the surface of the lower portion 216 of the lens barrel 210 to the inner surface of the body 258 of the collet 250. The collet 250 may include a fastening structure such as threads 256 on the outer surface of the body 258. In FIG. 2, the threads 258 are illustrated with dotted lines to indicate that they are on the outer surface of the collet 250 and not part of the cross-sectional view. The lens mount 220 may also include a fastening structure, reciprocal to the fastening structure of the collet 250, such as threads 226 on the surface of the tube portion 222 of the camera lens mount 220. The fastening structures of the lens mount 220 and of the collet 250 may be configured to mate with each other such that the collet 250 may be fastened to the lens mount 220. The fastening structures of the lens mount 220 and of the collet 250 may be tunable with respect to each other to enable the vertical position of the collet 250 within the lens mount 220 to be vertically adjusted after curing. Because the lens barrel 210 is affixed to the collet 250, the vertical position of the lens barrel 210 may be adjusted relative to the lens mount 220. For example, in a threaded assembly, the collet 250 can be rotated in a first direction to lower the lens barrel 210 with respect to lens mount 220 and can be rotated in a second direction to raise the lens barrel 210 with respect to the lens mount 220. The body 258 of the collet 250 may extend away from the lens window 112 when assembled and into the channel of the tube portion 222 of the camera lens mount 220.

In some embodiments, after the post-tuning operation adjusts the focal plane to be aligned with or substantially aligned with the image plane 171, the collet 150 which is affixed to the lens barrel 210 may be affixed to the lens mount 220 by adhering the lens barrel 210 to the lens mount 220 and curing the adhesive. This prevents the collet 150 from moving relative to the lens mount 220 thereby prevents the optical components of the lens barrel 210 from moving relative to the image sensor assembly 130 from their aligned positions. Accordingly, the focal plane can be maintained in alignment with or substantially in alignment with the image plane 171.

In various embodiments, as tuning may result in particle generation, a viscous non-curing fluid can be applied to the threads 226 and 258 in order to provide sealing and particle retention. The body 258 of the collet 250 may be tapered and the channel 128 of the lens mount 220 may be configured to include an interior lip (not shown) to retain the fluid and preclude it from being deposited onto the sensor.

Figure 3:
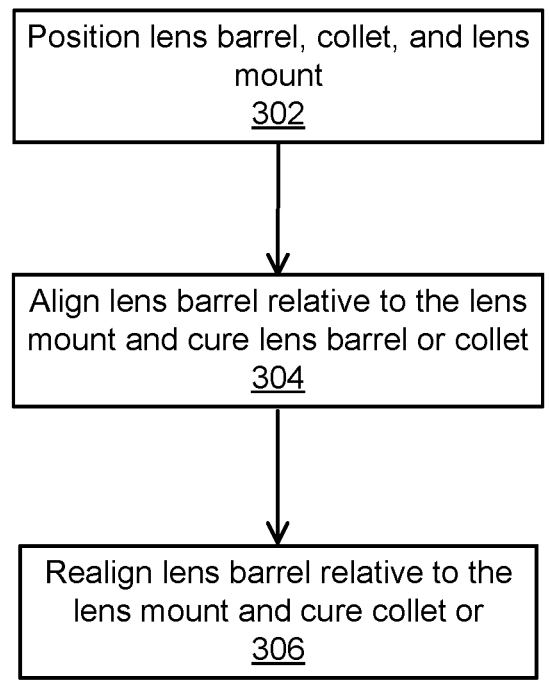
FIG. 3 is a flowchart illustrating an example process for manufacturing an integrated image sensor and lens assembly, according to one embodiment.

FIG. 3 illustrates an example processing of manufacturing an integrated image sensor and lens assembly. The lens barrel, collet, and lens mount may be positioned 302. Particularly, the collet may be positioned within the channel of the tube portion of the lens mount, and the lens barrel may be positioned within the collet. In a process for manufacturing an integrated image sensor and lens assembly 100 consistent with the embodiment of FIG. 1, the lens barrel 110 may be coupled to the collet 150 via the fastening structures of the lens barrel 110 and of the collet 150. Here, the assembled lens barrel 110 and the collet 150 may be slid into the lens mount 120. Alternatively, in a process for manufacturing an integrated image sensor and lens assembly 200 consistent with the embodiment of FIG. 2, the collet 250 may be coupled to the lens mount 220 via the fastening structures of the collet 250 and of the lens mount 220, and the lens barrel 210 may be slid into the collet 250. The lens barrel (or assembled lens barrel and collet) may be aligned 304 and the focal plane may be checked to achieve the best focus while eliminating the tilt of the optical axis. Once aligned, in a process for manufacturing the integrated image sensor and lens assembly 100 of FIG. 1, the collet 150 may be affixed, for example, via adhesive, to the lens mount 120 where the lens barrel 110 is fastened to the collet 150. Alternatively, in a process for manufacturing the integrated image sensor and lens assembly 200 of FIG. 2, the lens barrel 220 may be affixed, for example, via adhesive, to the collet 250 and the collet 250 may be fastened to the lens mount 220 via the threads. The adhesive may be cured.

The position of the lens barrel may be re-aligned 306 (e.g., by rotation) relative to the lens mount to compensate for the focal plane shift that may have occurred during assembly/curing and/or temperature cycling. For example, in a process for manufacturing the integrated image sensor and lens assembly 100 of FIG. 1, the lens barrel 110 may be adjusted by rotating the lens barrel 110 within the collet 150 via the threads. Alternatively, in a process for manufacturing the integrated image sensor and lens assembly 200 of FIG. 2, the lens barrel 210 may be adjusted by rotating the collet 250 within the lens mount 220. As such, the focal plane may be aligned with or substantially aligned with the image plane. Once aligned, in a process for manufacturing the integrated image sensor and lens assembly 100 of FIG. 1, the lens barrel 110 may be affixed, for example, via adhesive, to the collet 150 where the collet 150 is affixed to the lens mount 120. Alternatively, in a process for manufacturing the integrated image sensor and lens assembly 200 of FIG. 2, the collet 250 may be affixed, for example, via adhesive, to the lens mount 220 where the lens barrel 210 is affixed to the collet 250. The adhesive may be cured.

Figure 4:
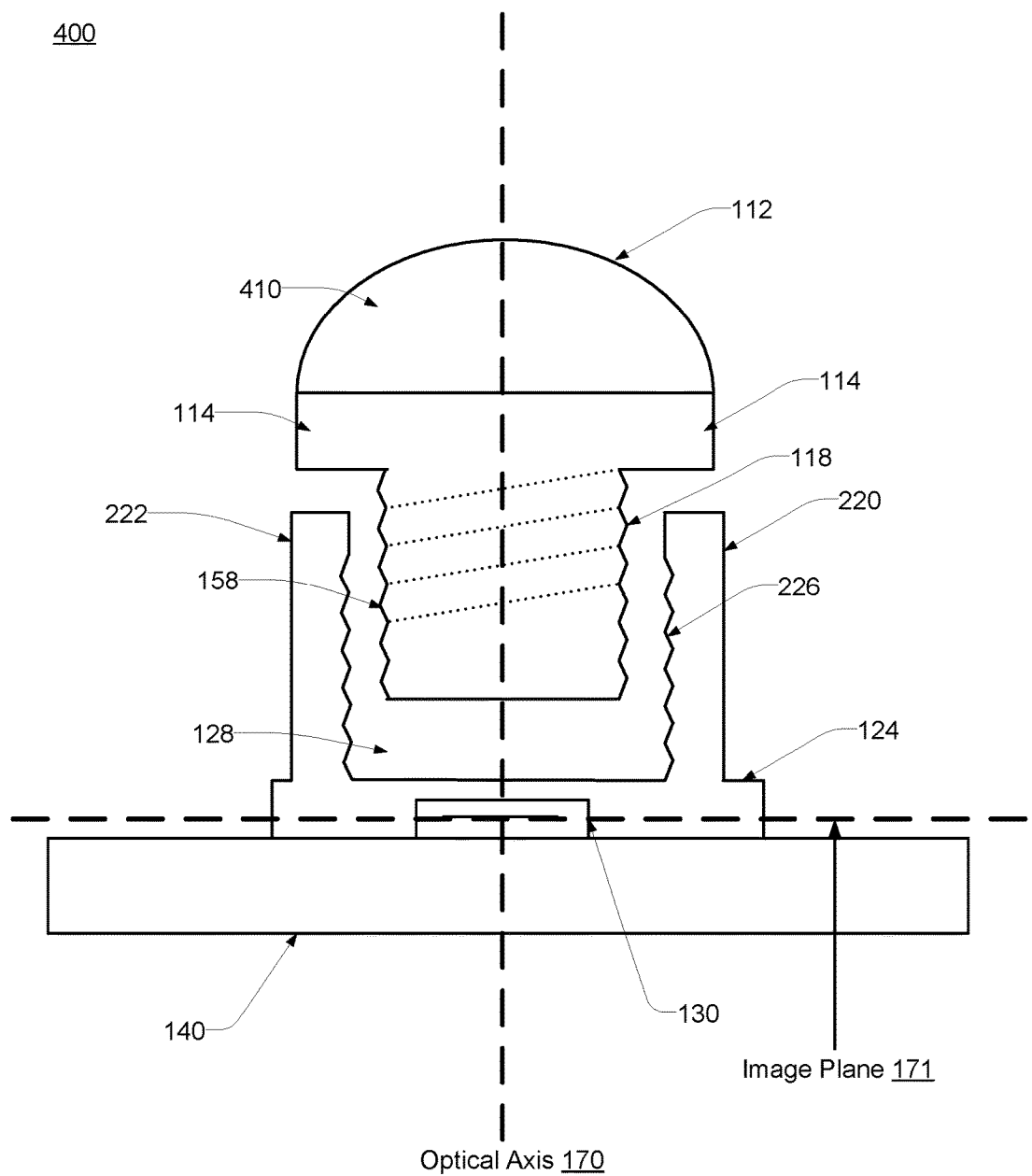
FIG. 4 illustrates a cross-sectional view of a third example integrated image sensor and lens assembly, according to one embodiment.

FIG. 4 illustrates an exploded cross-sectional view of an embodiment of an integrated image sensor and lens assembly 100 that includes a camera lens barrel 410, a camera lens mount 220, and an image sensor substrate 140. Compared to the embodiments as described with respect to FIGS. 1-2 that include a structure involving three components (i.e., a lens barrel, a collet, and a camera lens mount), the embodiment illustrated in FIG. 4 includes a structure involving two components (e.g., a lens barrel 410 and a camera lens mount 420). Thus, the embodiment of FIG. 4 may omit the collet 150, 250 and the lens barrel 410 may attach directly to the lens mount 220 in a tunable manner. As illustrated, the surface of the tube portion 222 of the lens mount 220 may include reciprocal tunable fastening structures such as threads that enable the lens barrel 410 to be adjusted within the lens mount 420 after assembly or curing. In this embodiment, a process of manufacturing includes placing the lens barrel 410 within the lens mount 220 and aligning the lens mount 220 to the image sensor assembly 130 for optimal focus. An adhesive may be then applied and cured to affix the image sensor assembly 130 to the lens mount 220. After assembly and curing, the focal plane may be adjusted by rotating the lens barrel 410 relative to the lens mount 420 to compensate for any shift on the focal plane that may have occurred during assembly and curing or due to temperature cycling.

Example Camera System Configuration

Figure 5:
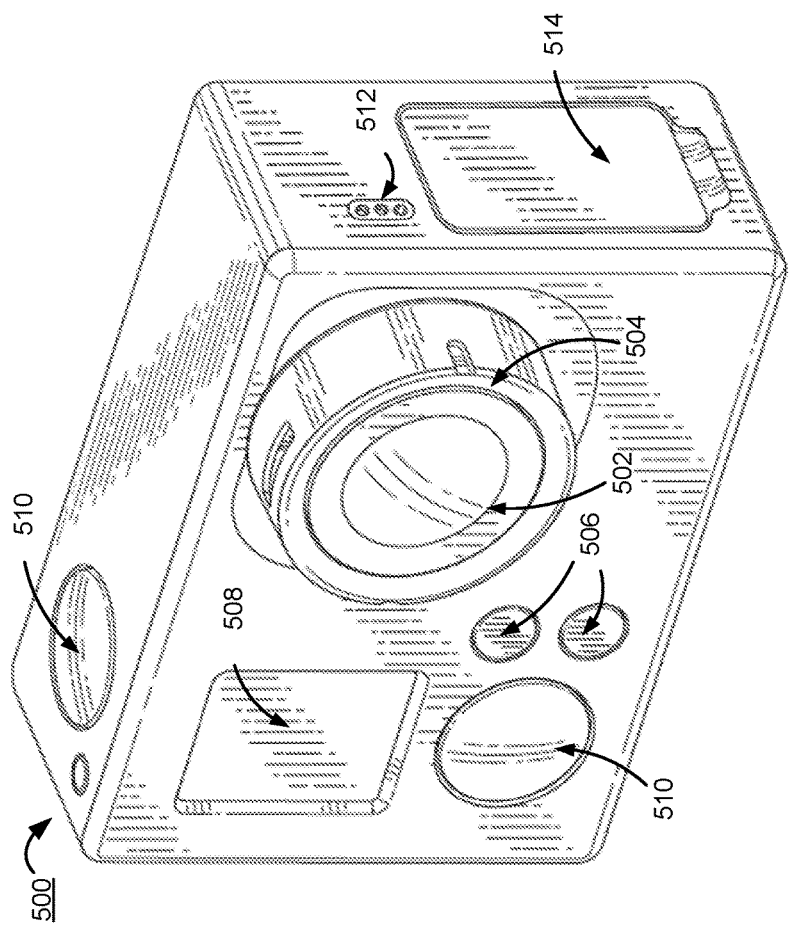
FIG. 5 illustrates an example camera that includes an integrated image sensor and lens assembly, according to one embodiment.

FIG. 5 illustrates an embodiment of an example camera 500 that includes an integrated image sensor and lens assembly (e.g., the integrated image sensor and lens assembly 100 (200 or 400) of FIG. 1 (2 or 4) described above). The camera 500 comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera 500 may be configured to capture images and video, and to store captured images and video for subsequent display or playback. As illustrated, the camera 500 may include a lens 502 configured to receive light incident upon the lens and to direct received light onto an image sensor internal to the lens. The lens 502 may be enclosed by a lens ring 504, which are both part of the integrated image sensor and lens assembly 100 (200 or 300) discussed above.

The camera 500 can include various indicators, including the LED lights 506 and the LED display 508. The camera 500 can also include buttons 510 configured to allow a user of the camera to interact with the camera, to turn the camera on, and to otherwise configure the operating mode of the camera. The camera 500 can also include a microphone 512 configured to receive and record audio signals in conjunction with recording video. The side of the camera 500 includes an I/O interface 514.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of manufacturing an integrated image sensor and lens assembly comprising:
   positioning a collet within a channel of a tube portion of a lens mount, the lens mount affixed to an image sensor substrate comprising an image sensor;
   positioning a lens barrel within the collet, the lens barrel housing a set of lenses for directing light to the image sensor, the lens barrel having threads on an exterior surface of the lens barrel that mate with threads on an interior surface of the collet, wherein rotation of the lens barrel within the collet causes a change in vertical alignment of the lens barrel;
   checking an alignment of an optical axis and a focal plane;
   aligning the lens barrel, the collet, and the lens mount such that the optical axis is substantially perpendicular to the focal plane and the focal plane is aligned with the image sensor;
   adhering the collet to the tube portion of the lens mount using an adhesive;
   curing the adhesive to affix the collet within the tube portion of the lens mount;
   after curing the adhesive, re-checking alignment of the optical axis and the focal plane; and
   rotating the lens barrel in the collet in a direction such that the focal plane is re-aligned with the image sensor.

2. The method of claim 1, further comprising:
after the focal plane is re-aligned with the image sensor, affixing the lens barrel to the collet via a second adhesive.

3. The method of claim 1, wherein the lens mount includes a base portion, the tube portion having a channel and extending from the base portion in a direction of an optical axis substantially perpendicular to a focal plane.

4. The method of claim 1, wherein the collet comprises a body extending into the channel of the tube portion and the collet comprises a first fastening structure.

5. The method of claim 4, wherein the lens barrel includes a first portion extending into the body of the collet and the lens barrel comprises a second fastening structure reciprocal to the first fastening structure.

6. The method of claim 5, wherein the lens barrel is mounted to the collet via the first fastening structure and the second fastening structure.

7. The method of claim 5, wherein the first fastening structure and the second fastening structure are configured to allow the lens barrel to move relative to the lens mount and to cause a shift in the focal plane in a direction along the optical axis.

8. The method of claim 5, wherein the first fastening structure and the second fastening structure are configured to maintain a position of the optical axis substantially perpendicular to the focal plane.

9. The method of claim 5, wherein the first portion of the lens barrel is tapered and the body of the collet comprises an interior lip configured to retain a fluid and to prevent the fluid from being deposited onto the image sensor.

10. The method of claim 9, wherein the fluid is viscous non-curing fluid.

11. The method of claim 4, wherein the first fastening structure is on an inner surface of the body of the collet.

12. The method of claim 1, further comprising:
providing the integrated image sensor and lens assembly within a camera; and
coupling a lens ring to the lens barrel external to a body of the camera.

13. The method of claim 12, further comprising:
providing an input mechanism to control the camera to capture an image corresponding to the light directed to the image sensor.

* * * * *